US010116183B2

(12) United States Patent
Jacobsen

(10) Patent No.: US 10,116,183 B2
(45) Date of Patent: Oct. 30, 2018

(54) PUMP ASSEMBLY WITH A TERMINAL BOX HAVING A METALLIC CONTACT COLLECTING CONDENSATION WITH A DRAIN CHANNEL

(71) Applicant: GRUNDFOS HOLDING A/S, Bjerringbro (DK)

(72) Inventor: John B. Jacobsen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 66 days.

(21) Appl. No.: 14/377,339

(22) PCT Filed: Feb. 7, 2013

(86) PCT No.: PCT/EP2013/052399
§ 371 (c)(1),
(2) Date: Aug. 7, 2014

(87) PCT Pub. No.: WO2013/117628
PCT Pub. Date: Aug. 15, 2013

(65) Prior Publication Data
US 2015/0303761 A1 Oct. 22, 2015

(30) Foreign Application Priority Data

Feb. 8, 2012 (EP) .................................... 12154461

(51) Int. Cl.
*H02K 5/10* (2006.01)
*H02K 7/14* (2006.01)
(Continued)

(52) U.S. Cl.
CPC .............. *H02K 5/10* (2013.01); *F01D 25/32* (2013.01); *F04D 1/00* (2013.01); *F04D 13/0606* (2013.01);
(Continued)

(58) Field of Classification Search
CPC .......... H02K 5/225; H02K 5/128; H02K 5/10; H02K 2205/09; F01D 25/32; F01D 25/30;
(Continued)

(56) References Cited

U.S. PATENT DOCUMENTS 2,323,146 A * 6/1943 Manney .................... H02K 9/24
220/374
5,006,742 A * 4/1991 Strobl ...................... H02K 5/10
310/43
(Continued)

FOREIGN PATENT DOCUMENTS

DE     EP 2072828     * 12/2007
DK     EP2072828      *  6/2009 ............. H02K 11/33
(Continued)

OTHER PUBLICATIONS

EP2072828—European Patent Application English Machine Translation from EPO website.*
(Continued)

*Primary Examiner* — Bernard Rojas
*Assistant Examiner* — Maged Almawri
(74) *Attorney, Agent, or Firm* — McGlew and Tuttle, P.C.

(57) ABSTRACT

A pump assembly includes an electric drive motor with a terminal box (6) arranged on the electric motor (4). At least one metallic component (34) extends from the electric drive motor (4) into an inside of the terminal box (6). A capture device (38, 40), for capturing condensation water collecting on the metallic component (34), is arranged in a proximity of the metallic component (34) in the inside the terminal box (6).

20 Claims, 3 Drawing Sheets

(51) Int. Cl.
   *H02K 11/00* (2016.01)
   *F01D 25/32* (2006.01)
   *F04D 1/00* (2006.01)
   *F04D 13/06* (2006.01)
   *F04D 29/54* (2006.01)
   *F04D 19/00* (2006.01)
   *F04D 25/06* (2006.01)
   *F04D 29/32* (2006.01)
   *F04D 29/40* (2006.01)
   *H02K 5/22* (2006.01)
   *H02K 11/33* (2016.01)

(52) U.S. Cl.
   CPC ........... *F04D 19/002* (2013.01); *F04D 25/06* (2013.01); *F04D 29/325* (2013.01); *F04D 29/40* (2013.01); *F04D 29/545* (2013.01); *H02K 5/225* (2013.01); *H02K 7/14* (2013.01); *H02K 11/00* (2013.01); *H02K 11/33* (2016.01); *H02K 2205/09* (2013.01)

(58) Field of Classification Search
   CPC . F04D 25/06; F04D 29/40; F04D 1/00; F04D 13/0606; F04D 13/0626
   USPC ............ 310/88, 87, 71; 417/423, 902, 423.3
   See application file for complete search history.

(56) References Cited

U.S. PATENT DOCUMENTS

| | | | | |
|---|---|---|---|---|
| 5,010,265 A * | 4/1991 | Tanaka | ................... | F02N 15/00 290/48 |
| 5,077,503 A * | 12/1991 | Tamura | ................... | H02K 5/10 310/88 |
| 5,767,596 A * | 6/1998 | Stark | ................ | H02K 5/00 29/596 |
| 5,872,410 A * | 2/1999 | Sudoff | ................... | H02K 5/225 310/68 R |
| 6,107,708 A * | 8/2000 | Yamaguchi | ........ | B60H 1/00457 310/58 |
| 6,371,167 B1 * | 4/2002 | Hosoya | ..................... | F16L 9/19 138/177 |
| 6,657,338 B2 * | 12/2003 | Fisher | ................... | H02K 17/30 310/68 R |
| 7,067,946 B2 * | 6/2006 | Noda | ..................... | F04D 25/082 310/52 |
| 7,898,126 B2 * | 3/2011 | Kato | ......................... | H02K 9/06 310/52 |
| 8,128,438 B2 * | 3/2012 | Bernard | ............. | H01R 13/5227 439/701 |
| 8,425,205 B2 * | 4/2013 | Li | .......................... | F04D 29/445 417/295 |
| 8,562,313 B2 * | 10/2013 | Andersen | ................. | H02K 3/50 29/596 |
| 9,246,367 B2 * | 1/2016 | Ohashi | ................... | H02K 5/04 |
| 2003/0102740 A1 * | 6/2003 | Marioni | ................... | H02K 5/10 310/87 |
| 2004/0263009 A1 * | 12/2004 | Noda | ..................... | F04D 25/082 310/71 |
| 2008/0284265 A1 * | 11/2008 | Chaohai | .................. | H02K 5/10 310/89 |
| 2009/0026878 A1 * | 1/2009 | Hansen | ................ | H02K 5/1285 310/272 |
| 2010/0111729 A1 * | 5/2010 | Andersen | ................ | H02K 3/50 417/423.7 |
| 2012/0013212 A1 * | 1/2012 | Vadillo | .................... | H02K 5/10 310/88 |
| 2013/0134807 A1 * | 5/2013 | Murata | ................. | E02F 9/0858 310/52 |

FOREIGN PATENT DOCUMENTS

| | | | | |
|---|---|---|---|---|
| DK | EP 2072828 A1 * | 6/2009 | ........... | H02K 5/1282 |
| EP | 1 947 343 A1 | 7/2008 | | |
| JP | S58 86842 A | 5/1983 | | |
| JP | H11 107960 A | 4/1999 | | |
| JP | 2001 317486 A | 11/2001 | | |
| JP | 2004 162609 A | 6/2004 | | |
| KR | 2009 0065938 A | 6/2009 | | |

OTHER PUBLICATIONS

English Translation of EP 2072828 from EPO website.*
EP 2072828 English Translation.*

* cited by examiner

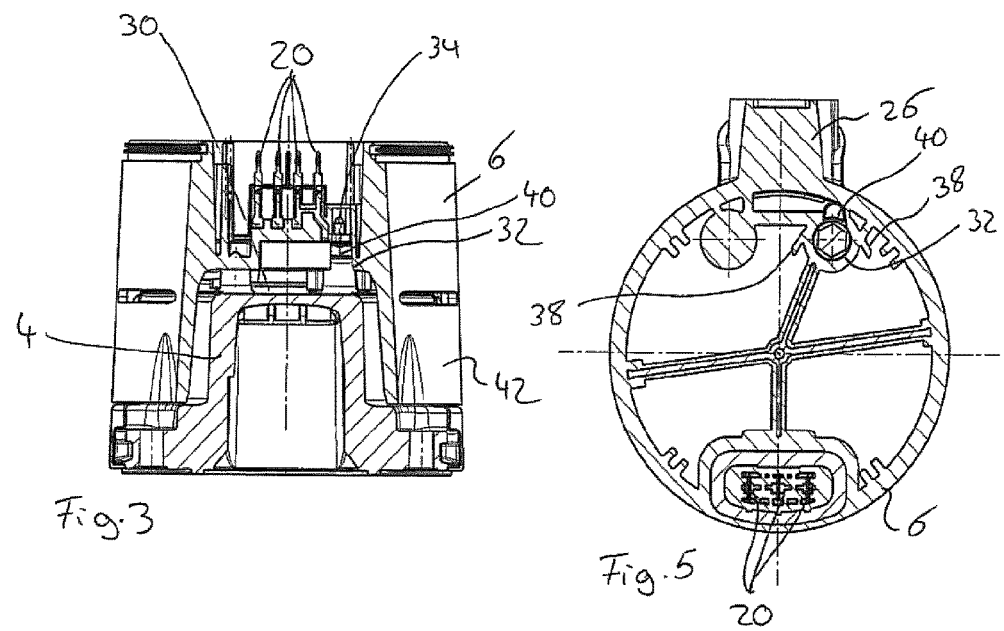
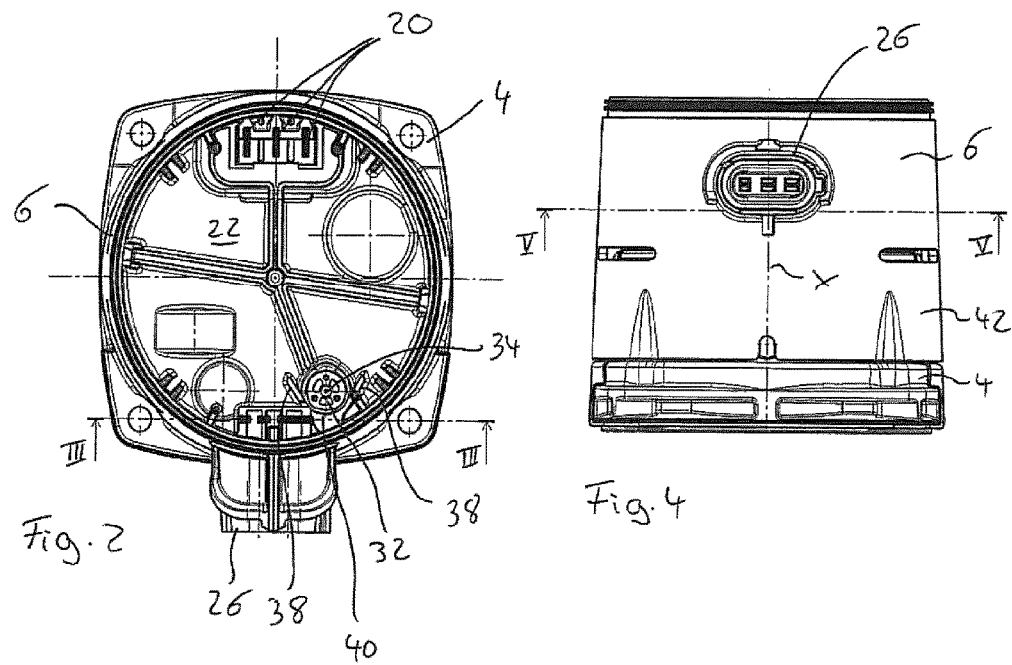

PUMP ASSEMBLY WITH A TERMINAL BOX HAVING A METALLIC CONTACT COLLECTING CONDENSATION WITH A DRAIN CHANNEL

CROSS REFERENCE TO RELATED APPLICATIONS

This application is a U.S. National Phase Application of International Application PCT/EP2013/052399 filed Feb. 7, 2013 and claims the benefit of priority under 35 U.S.C. § 119 of European Patent Application EP 12154461.3 filed Feb. 8, 2012, the entire contents of which are incorporated herein by reference.

FIELD OF THE INVENTION

The invention relates to a pump assembly with an electric drive motor and with a terminal box arranged on the electric drive motor, wherein at least one metallic component extends from the electric drive motor into the inside of the terminal box.

BACKGROUND OF THE INVENTION

Pump assemblies are known, which form a subassembly of a pump, an electric drive motor and an electronics housing or terminal box which is arranged on the drive motor and in which electrical and/or electronic components for the connection and for the control or regulation (closed-loop control) of the drive motor are arranged. Such pump assemblies are often applied in a humid or damp environment. Thereby, there exists the problem that moisture can penetrate into the terminal box and there can compromise the functioning of the electronics. For this reason, the terminal box as a rule is designed in a sealed manner. However, it is indeed when external connections such as connection plugs or likewise are provided, that it is difficult to design the terminal box in such a sealed manner that one can reliably be able to rule out moisture penetrating into the inside.

SUMMARY OF THE INVENTION

With regard to this problem, it is the object of the invention to improve a pump assembly with an electric drive motor, to the extent that electronic components in the inside of a terminal box are protected better from moisture.

According to the invention, a pump assembly is provided with an electric drive motor and with a terminal box arranged on the electric drive motor. At least one metallic component extends from the electric drive motor into an inside of the terminal box. A capture device, for capturing condensation water collecting on the metallic component), is arranged in the proximity of the metallic component, in the inside of the terminal box.

The pump assembly in the known manner comprises a pump impeller which is preferably arranged in a pump housing and is rotatingly driven by an electric drive motor. The electric drive motor preferably comprises a stator housing, in which the stator and the rotor of the drive motor are arranged and which is preferably fixedly connected to a pump housing of the pump assembly. According to the invention, a terminal box is arranged on the drive motor, i.e. preferably on the outer side of the stator housing, in which terminal box electric and/or electronic components for the connection and/or for the closed-loop control or open-loop control of the drive motor are arranged. A metallic component extends from the electrical drive motor into the inside of the terminal box. A capture device is arranged in the inside of the terminal box, in the proximity of the metallic component. This is designed such that it can capture condensation water which collects at the metallic component. The metallic component thus serves as a collection point for condensation water in the inside of the terminal box, so that the condensation water preferably condenses on this metallic component and not on the other components. When the water drops away from the metallic component, it is then captured by the capture device in a targeted manner so that it does not come into contact with electrical or electronic components in the inside of the terminal box and compromise these in their functioning.

The metallic component can then in particular serve as a collection point for condensation water, if it is connected to the electric drive motor in a thermally conductive manner and this drive motor in the region, in which the metallic component is connected to the drive motor, is cooled to a greater extent than the interior of the terminal box. Thus, the metallic component in the inside of the terminal box forms a cold point, at which water condenses in a targeted manner. A cooling can for example be effected by the cooling of the electric motor, for example by way of a fan or however by metallic housing parts, whilst mostly a higher temperature prevails in the terminal box due to the waste heat of the electronic components. A particularly good cooling can be achieved if the pump assembly is applied as a pump for cold media and the pump assembly is cooled by the delivered cold medium, i.e. preferably cold water.

The capture device is preferably designed as a collection space which is open to the top and which in at least one predefined installation position of the pump assembly is arranged below the metallic component in the inside of the terminal box. The moisture can drop down from the metallic component through the opening on the top side, into the collection space and be collected there. A predefined installation position results for example due to the user being specified a defined installation position for the pump assembly, in which position the pump assembly is to be operated or installed. The collection space is then arranged in this installation position in the described manner, so that it is open to the top.

Particularly preferably, the collection space comprises at least one run-off opening which is open to an outer side of the terminal box and which is arranged in a manner such that condensation water captured by the capture device can run outwards through this run-off opening, out of the inside of the terminal box. In particular, the run-off opening is connected to the previously described collection space, so that the condensation water collecting there can run out through the run-off opening outwards out of the terminal box. In the mentioned defined installation position of the pump assembly, the run-off opening is preferably opened to the bottom or is aligned at an angle of less than 90° to the horizontal, in order to ensure a discharge of condensation water to the outside. In order to support this discharge or drainage and to simultaneously prevent the penetration of moisture from the outside, the run-off opening can be provided with a filter or valve which permits a fluid passage in only one direction, specifically from the inside out of the terminal box to the outside. Thus, a material with a capillary effect, for example a sinter filter which due to the capillary effect ensures that the moisture is led from the inside of the terminal box from the capture device to the outside of the terminal box, can be arranged in the opening.

Additionally or alternatively to the run-off opening, a binding agent for binding the captured moisture can be arranged in the capture device and in particular in the collection space. The receiving capacity of the binding agent is then preferably dimensioned such that all moisture which collects in the terminal box in a defined operating duration of the pump assembly, can be captured and bound.

A run-off opening is preferably formed in a wall adjacent to the metallic component. Thus, the run-off opening is arranged as close as possible to the metallic component, so that moisture which collects on the metallic component due to condensation, can be led away to the outside out of the inside of the terminal box over the shortest possible path and does not come into contact with further, in particular electrical or electronic components in the inside of the terminal box.

The collection space further preferably comprises at least two side surfaces which taper obliquely to one another and which in the region of their smallest distance to one another are adjacent the discharge opening. I.e. the two side surfaces extend obliquely downwards, i.e. inclined to the horizontal towards the run-off opening, so that condensation water captured in the collection space is led via oblique side surfaces towards the run-off opening. The side surfaces which taper obliquely to one another thus define a channel-like or trough-like collection space, at whose lowest point the run-off opening is preferably arranged. This configuration, as previously described, is preferably the case with at least one defined installation position of the pump assembly.

Particularly preferably, with regard to the electric drive motor, it is the case of a wet-running electric motor. With wet-running electric motors, the rotor space of the drive motor is filled with the fluid to be delivered which thus contributes to a cooling of this region. This as a whole leads to a cooling of the drive motor, so that preferably the metallic component connected to the electric drive motor is also cooled and thus in the inside of the terminal box, on account of the heat-conducting characteristics of this, preferably forms the coldest point, at which water or moisture condenses in the terminal box. Thus, water in the terminal box can be collected in a targeted manner and this terminal box can be kept dry in the regions, in which electrical or electronic components are arranged. Such a cooling is particularly given, if with regard to the pump assembly, it is the case of a pump assembly which delivers a cold medium, in particular cold water. Then a particularly great cooling of the rotor space and thus of the drive motor takes place. Due to the heat-conducting characteristics thus the metal component which is connected to the drive motor is also cooled to into the terminal box.

For this, the metallic element is preferably connected to a stator housing or a can of the electric drive motor. These components are preferably likewise formed from metal and have good heat-conducting characteristics. The stator housing can thereby be cooled by surrounding air or however by a connection to the can and/or to the pump housing, also by the medium to be delivered. The can, as described, is preferably cooled by the medium which is to be delivered, in particular if it is the case of a cold water pump.

With regard to the metallic element, it is further preferably the case of an electrical contact and in particular an earth contact. Such an earth contact is usually connected to the metallic stator housing of the pump assembly, in order to create the earth connection from an electric connection lead, which is electrically connected in the terminal box, to the other metallic components of the pump assembly, i.e. in particular to the stator housing and the pump housing. Due to the thermally conductive characteristics of the earth contact, this results in this, as a metallic component in the inside of the terminal box, being able to form a cold point, preferably the coldest point, at which condensation water collects and can then be captured via the capture device as described. Instead of an electric contact or an earth contact, however another metallic element such as for example a connection screw or a metallic bolt as a metallic element can project into the terminal box and have the described function for collecting condensation water.

The metallic component preferably extends through an opening in the base of the terminal box, into this. The base of the terminal box is thereby that wall of the terminal box, which faces the drive motor. The terminal box can be arranged at the axial end of the drive motor or its stator housing or however radially to this in the peripheral region. With the axial arrangement, the base preferably extends transversely to the longitudinal axis or rotation axis of the pump assembly, parallel to the axial end-side of the stator housing. With a radial or peripheral arrangement, the base preferably extends in the peripheral direction or tangentially to the outer periphery of the stator housing.

A seal is preferably arranged in the opening and closes the opening to the outside in a sealed manner and preferably comes to sealingly bear on a wall of a stator housing of the electrical drive motor. Thus, one prevents moisture from being able to penetrate from the outside through the opening into the inside of the terminal box. The seal can, as described, come to bear on a wall of a stator housing, in the peripheral region of the metallic component. Alternatively or additionally, the seal can also come to bear on the outer periphery of the metallic component in a direct and sealing manner.

The run-off opening is preferably formed in a peripheral wall extending transversely, in particular essentially normally to the base. Thereby, the metallic element can further preferably extend essentially parallel to the peripheral wall into the inside of the terminal box. In a defined installation position of the pump assembly, this extension direction is particularly preferably a horizontal direction. Moisture or condensation water can then drop downwards and be captured by a capture device arranged below the metallic component. This capture device is then preferably formed on the peripheral wall which extends transversely to the base and on which the run-off opening is also located. The run-off opening is thereby preferably situated at the deepest location of the capture device and further preferably at the lowest location of the peripheral wall, so that the moisture can be led away outwards by way of gravitational force. Such a design lends itself particularly well, if the terminal box is arranged on the axial side of the cylindrical stator housing, and the longitudinal axis of the stator housing which corresponds to the rotation axis of the rotor shaft arranged in the inside, extends horizontally in the at least one defined installation position. Thereby, the metallic component can likewise extend horizontally from the axial end-side of the stator housing through the base of the terminal box, into this.

The run-off opening is usefully situated in a region of the peripheral wall which lies closest the metal component. This permits the arrangement of the run-off opening as close as possible to the metallic component, so that moisture which collects on the metallic component can be led directly to the run-off opening without moisture penetrating into other regions of the terminal box.

Particularly preferably, the terminal box arranged on the electric motor is completely closed to the outside with the exception of the run-off opening. I.e. preferably all necessary openings are provided with seals, in order to prevent a penetration of moisture from the outside.

According to a further preferred embodiment, the run-off opening is formed in a wall, in particular an outer wall of the terminal box, and on the outer side of the wall is covered by an outer wall distanced to the outer side of the wall. Thus, a seal of the labyrinth type can be created, which prevents a penetration of moisture from the outside into the run-off opening. In particular, the outer wall protects the run-off opening with regard to water jets and water spray being able to enter into the run-off opening from the outside. The run-off opening is preferably formed in a wall of the terminal box which is adjacent the stator housing, and the outer wall is a wall which overlaps or covers the stator housing on the outer side, in particular in a peripheral manner. The outer wall can thereby be arranged distanced to the outer side of the stator housing, so that a free space or a gap remains, which connects on the outer side to the run-off opening. Thus, condensation water can flow away through the run-off opening and through this free space in the peripheral region of the stator housing. The free space thereby simultaneously forms an air channel which has the effect that air which enters into the run-off opening, must firstly flow through this channel. The channel is preferably open at the axial end of the stator housing which faces the pump housing and thus has a length which corresponds preferably essentially to the axial length of the stator housing. The air must therefore cover a relatively long path from the outside to the run-off opening, so that it can already be dried on this path, in particular if humidity in the air on this path already condenses on the outer periphery of the stator housing. It is ensured to an even greater extent that no moisture can penetrate the terminal box from the outside in this manner.

Such a design can also be realized with each and any opening of the terminal box. Thus, the terminal box can preferably have an opening, on whose outer side an air channel connects, said air channel being led along an outer side of a stator housing of the electrical drive motor. Thereby, the air channel particularly preferably extends essentially over the whole axial length of the stator housing. The air channel can be formed by an outer wall which peripherally surrounds the stator housing and is distanced to the outer periphery of the stator housing, so that the stator housing is surrounded peripherally by a free space which functions as an air channel. In particular, if the pump assembly is applied as a cold water pump or as a pump for delivering cold media, the stator housing becomes so cold that moisture from the air already condenses there on the way to the opening, so that the air penetrates the terminal box in a dried manner. It is to be understood that this embodiment can be realized with an air channel connecting to an opening, also independently of the previously described invention, which relates to the arrangement of a metallic component connected to the electric motor, in the inside of the terminal box with an associated capture device for capturing condensation water collecting on the metallic component.

The pump assembly is particularly preferably designed as a circulation pump assembly, in particular a circulation pump assembly for a heating installation or air-conditioning installation.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a plan view of a terminal box of a pump assembly according to the invention;

FIG. 3 is a sectioned view along the line III-III in FIG. 2;

FIG. 4 is a lateral view of the terminal box according to FIGS. 2 and 3;

FIG. 5 is a sectioned view along the line V-V in FIG. 4; and

DESCRIPTION OF THE PREFERRED EMBODIMENTS

Figure 1:
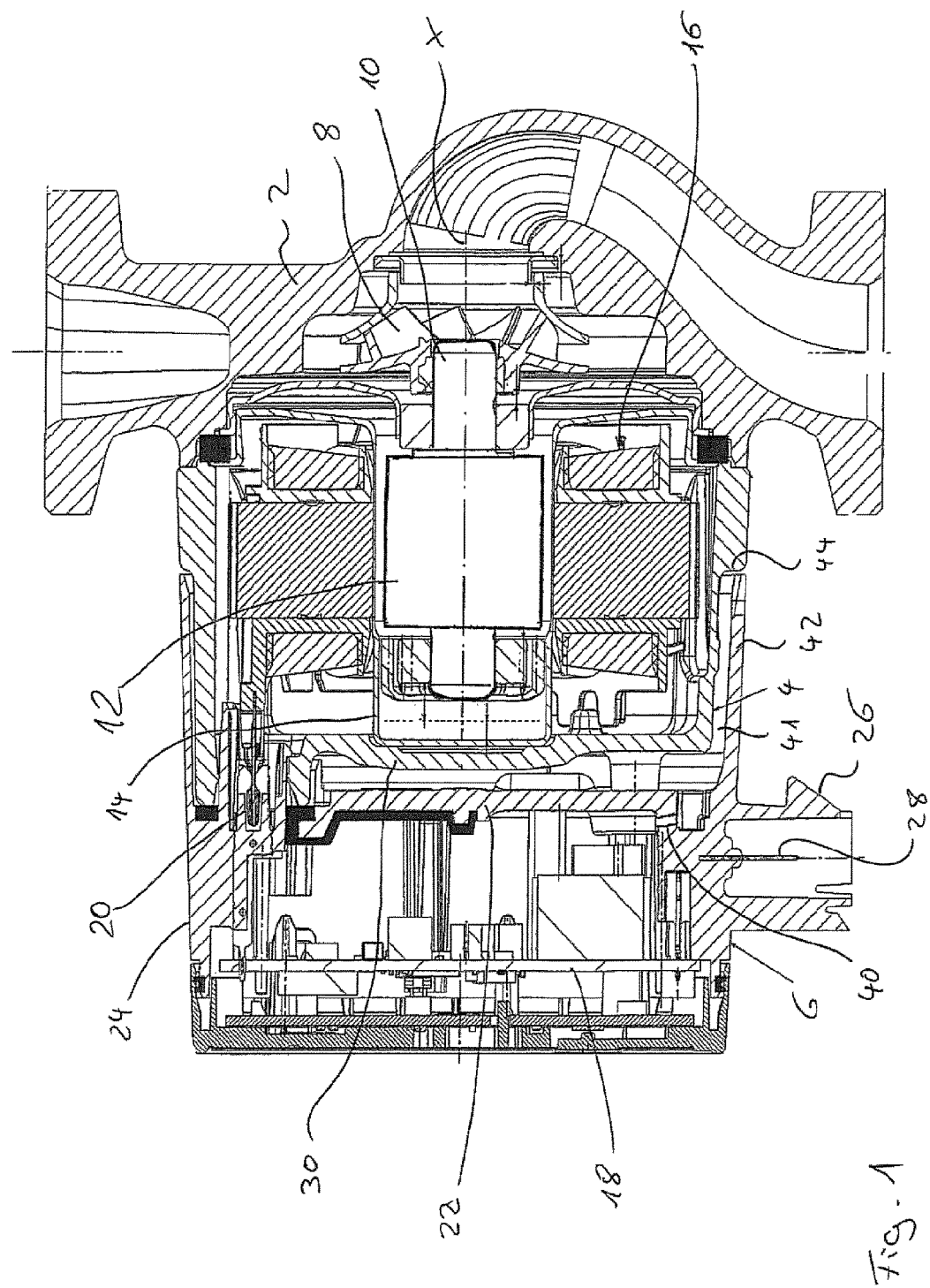
FIG. 1 is a sectioned view of a pump assembly according to the invention.
Figure 6:
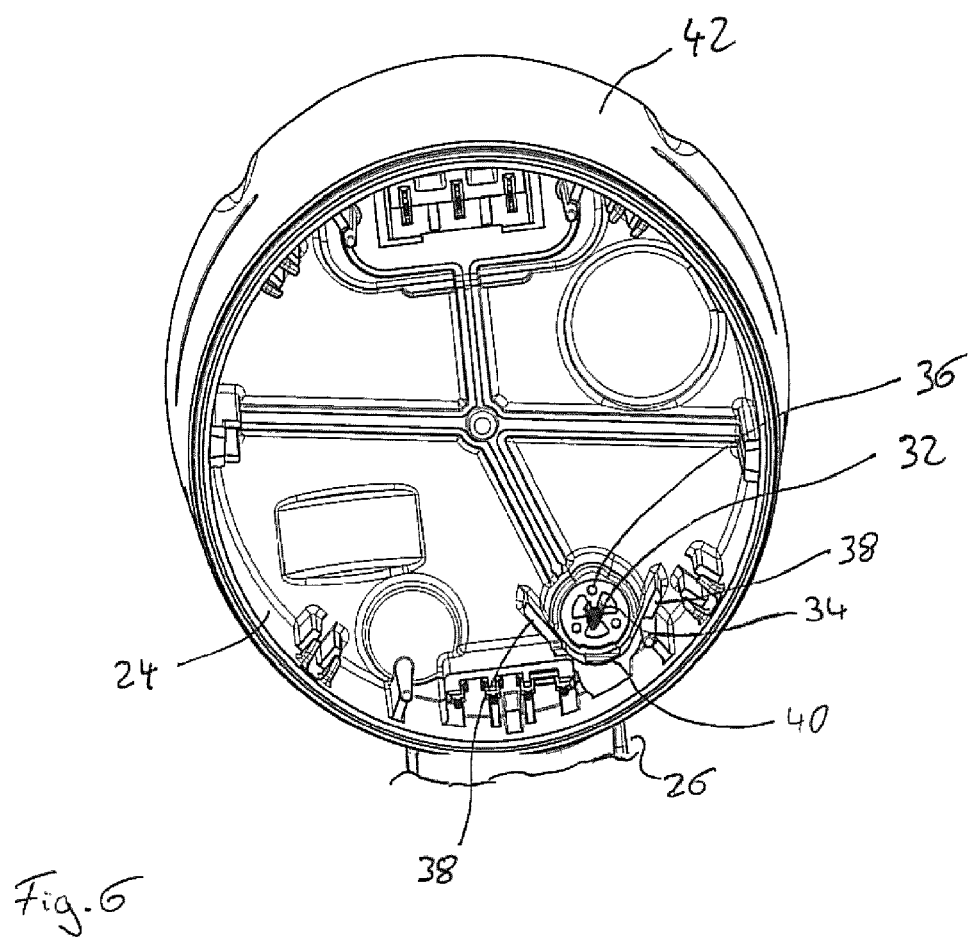
FIG. 6 is a perspective plan view of the terminal box according to FIGS. 2 to 5.

Referring to the drawings in particular, the pump assembly shown in FIG. 1 forms a subassembly of a pump housing 2, of a stator housing 4 which forms the housing of an electric drive motor and of a terminal box 6. An impeller 8 is arranged in the known manner in the pump housing 2 and is connected via a rotor shaft 10 to a rotor 12 of the electrical drive motor. The rotor 12 is arranged in a rotor space delimited by a canned pot or a can 14. I.e. it is the case of a wet-running electric motor. The stator 16 of the electric drive motor is arranged on the peripheral side of the can 14, in the inside of the stator housing 4.

The terminal box 6 contains electronic components for the open-loop or closed-loop control of the electric drive motor. Thereby, it can in particular be the case of a frequency converter. The electronic components are arranged on a circuit board 18 in the inside of the terminal box 6. The terminal box 6, for the electrical connection to the stator 16, comprises cast-in electrical connection contacts 20 which come into engagement with the corresponding connection plug on the stator housing 4. No opening in the base 22 of the terminal box 6 is required for the contacts 20 due to them being cast in, so that this terminal box can be closed and designed in a sealed or tight manner, in the region of the connection counts 20. The terminal box 6 furthermore on its peripheral wall 24 extending transversely to the base 22 comprises a plug coupling 26 which is integrally formed as one piece and which comprises connection contacts 28 likewise cast in and extending through the peripheral wall 24 into the inside of the terminal box 6. The connection contacts 28 serve for the connection to a mains connection lead. The terminal box 6 is also designed in a sealed manner in this region on account of the casting into the peripheral wall 24.

The terminal box 6 as shown, is applied on the axial side in the direction of the longitudinal axis or the rotation axis X of the pump assembly, onto the stator housing 4, so that the base 22 extends essentially parallel to the axial end-side 30 of the stator housing 4 transversely to the longitudinal axis X.

The base 22 comprises an opening 32. An earth contact 34 extends through the opening 32 into the inside of the terminal box 6. The earth contact 34 is designed as a metallic component which is electrically conductively connected to the stator housing likewise formed of metal, and extends from the axial end-side 30 of this stator housing parallel to the longitudinal axis X, into the terminal box 6. A contact element 36, which is electrically conductively connected to the one of the connection contacts 28 functioning as an earth lead or protective lead, is cast in the base 22 of the terminal box 6.

The earth contact 34 as a metallic component which is connected to the metallic stator housing 4 is also connected to the stator housing 4 in a heat-conducting manner. Moreover, one can recognize that the can 14 at least on the axial side bears on the inner side of the stator housing 4. Thus, here a thermally conductive connection is also created. If the pump delivers a cold medium, for example cold water, then this also gets into the inside of the can 14 and a cooling of the can 14 and also of the stator housing 4 occurs. Thus, the earth contact 34 also cools down and thus in the inside of the terminal box 6 forms a cold, preferably the coldest point, at which condensation water can therefore collect in the inside of the terminal box 6. Thus, the moisture in the inside of the terminal box 6 can be collected at the earth contact 34 in a targeted manner, so that the moisture does not compromise the function of the electrical components on the circuit board 18.

A capture device is formed in the inside of the terminal box 6, in order to capture condensation water dropping away from the earth contact 34. This capture device is formed by two wall elements 38 extending to one another in a V-shaped manner. The side surfaces of these wall elements 38 which face one another thus define a capture channel. A run-off opening 40 is arranged on the base of the thus formed channel, in the region, at which the wall elements 38 border one another. The run-off opening 40 is arranged in the peripheral region, i.e. in the peripheral wall 24 of the terminal box 6. At least when the described capture device is to fulfil its purpose below the earth contact 34, then the pump assembly described here is to be used in a defined installation position, in which in this embodiment example the plug coupling 26 is directed vertically downwards. The run-off opening 40 is also directed downwards in this defined installation position. The run-off opening 40 is situated in the peripheral wall 24, at the deepest location of the capture channel formed by the wall elements 28. The wall elements 38 extend so far, that they are not only situated vertically below the complete earth contact 34 but also the metallic contact element 36 in the base 22 of the terminal box 6. Thus, the capture channel which is spanned by the wall elements 38 also captures condensation water which drops from the contact element 36. The condensation water is fed from the wall elements 38 to the run-off opening 40 and can exit to the outside through this, out of the terminal box 6.

The run-off opening 40 however is not open directly to the outside, but opens into a free space or annular gap 41 which is formed between the outer periphery of the stator housing 4 and an outer wall 42 which extends as an axial extension of the peripheral wall 24 beyond the outer periphery of the stator housing 4. I.e. the terminal box 6 with its outer wall 42 overlaps the outer periphery of the stator housing 4. As is to be seen in FIG. 1, the annular gap 41 does not need to be concentric to the longitudinal axis X. In contrast, in this embodiment it has a greater height or radial width on the lower side (in the defined installation position of the pump assembly) than on the upper side. The condensation water flows out of the run-off opening 40 into this annular gap 41 and can exit from this at the axial end of the outer wall 42 which has an essentially cylindrical, i.e. here slightly conical shape. I.e. the condensation water then exits at the annular gap between the axial end of the outer wall 42 and the oppositely lying step 44 on the outer periphery of the stator housing 4.

By way of the fact that the channel which is formed by the annular gap 41 and through which the condensation water must flow off, extends over a large axial length in the direction of the longitudinal axis X, one succeeds in the water or moisture not being able to enter from the outside into the run-off opening 40 without further ado, so that no additional danger of moisture penetrating into the inside of the terminal box 6 is created by the run-off opening 40.

Moreover, the annular gap 41 has the effect of air firstly being dried before it enters into the run-off opening 40, since this air in the annular gap 41 must flow in the axial direction along the outer periphery of the stator housing 4. Since the stator housing 4 is of metal and is connected to the pump housing and the can 14 in a thermally conductive manner, the stator housing 4 cools when delivering cold media, in particular cold water, so that the moisture in the air flowing into the annular gap 41 is condensed on the outer periphery of the stator housing 4, and the air when it reaches the run-off opening 40 is essentially dried. The condensation water can drop from the stator housing 4 and flow off through the annular gap 41 to the gap on the step 44 of the stator housing 4 and can exit there to the outside. This is encouraged due to the fact that the outer wall 42 not being exactly symmetrical but rather being conical at its inner periphery, wherein it tapers towards the actual terminal box 6. In this manner, a gradient to the step 44 is achieved with the defined installation position shown in FIG. 1 and this gradient encourages the flowing-away of the water.

While specific embodiments of the invention have been shown and described in detail to illustrate the application of the principles of the invention, it will be understood that the invention may be embodied otherwise without departing from such principles.

The invention claimed is:

1. A pump assembly comprising:
   an electric drive motor;
   a terminal box arranged on the electric drive motor, the terminal box comprising electric and electronic components for controlling the electric drive motor, wherein the electric drive motor is a wet-running electric motor;
   at least one metallic component extending from the electric drive motor into an inside of the terminal box;
   at least one of a stator housing and a can of the electrical drive motor, wherein the metallic element is connected to the stator housing or to the can of the electrical drive motor, the at least one metallic component being electrically conductively connected to at least the stator housing; and
   a capture device for capturing condensation water collecting on the metallic component, the capture device being arranged in a proximity of the metallic component, in the inside of the terminal box, the capture device being arranged below the at least one metallic component, the capture device comprising a collection space, the collection space being open to the top, wherein moisture from the at least one metallic component drops in a downward direction through the opening into the collection space, wherein the moisture is collected in the collection space.

2. A pump assembly according to claim 1, wherein the metallic element is an electrical contact and in particular an earth contact, the capture device comprising a first wall and a second wall arranged in the terminal box interior space, the first wall extending in a first direction and the second wall extending in a second direction that intersects the first direction, the terminal box comprising an opening, the opening being located adjacent to the first wall and the second wall.

3. A pump assembly according to claim 1, further comprising a stator housing of the electric drive motor, wherein the terminal box comprises at least one opening, with an outer side in contact with an air channel, said air channel being led along an outer side of the stator housing of the electric drive motor, said capture device comprising two walls arranged in a v-shape in the inside of said terminal box, said two walls extending toward each other, said at least one opening being located adjacent to said two walls.

4. A pump assembly according to claim 1, wherein the pump assembly comprises a circulation pump assembly.

5. A pump assembly according to claim 1, wherein a space is provided between the metallic component and collection space.

6. A pump assembly according to claim 5, wherein the collection space is provided with at least one run-off opening which is open to an outer side of the terminal box and which is arranged in a manner such that condensation water captured by the capture device can run off to the outside through this run-off opening, out of the inside of the terminal box.

7. A pump assembly according to claim 6, wherein the run-off opening is formed in a wall which is adjacent the metallic component.

8. A pump assembly according to claim 6, wherein the collection space comprises at least two side surfaces which taper obliquely to one another and which, in a region of a smallest distance to one another are adjacent the run-off opening.

9. A pump assembly according to claim 6, wherein the terminal box, arranged on the electric drive motor, is completely closed to the outside, with the exception of the run-off opening.

10. A pump assembly according to claim 6, wherein the run-off opening is formed in a wall of the terminal box and is covered on the outer side of the wall by an outer wall distanced to the outer side of the wall.

11. A pump assembly according to claim 6, wherein the metallic component extends through an opening in a base of the terminal box, into the terminal box.

12. A pump assembly according to claim 11, further comprising a stator housing of the electric drive motor, wherein a seal is arranged on the opening, said seal closing the opening to the outside in a sealed manner and coming to sealingly bear on a wall of the stator housing of the electric drive motor.

13. A pump assembly according to claim 11, wherein the run-off opening is formed in a peripheral wall extending transversely to the base.

14. A pump assembly according to claim 13, wherein the run-off opening is situated in a region of the peripheral wall which lies closest to the metallic component.

15. A pump assembly comprising:
an electric drive motor comprising a stator housing, said stator housing comprising an axial end side;
a terminal box connected to said electric drive motor, said terminal box comprising a terminal box interior space and electric and electronic components for controlling said electric drive motor;
a metallic component extending from at least said axial end side of said stator housing to said terminal box interior space, wherein at least a portion of said metallic component is located in said terminal box interior space, said metallic component being electrically conductively connected to at least said stator housing;
a drip collection arrangement for receiving condensation water collecting on said metallic component, said drip collection arrangement being arranged in said terminal box interior space in an area located below said metallic component, said drip collection arrangement being formed separate from said metallic component, said drip collection arrangement being located at a spaced location from said at least said portion of said metallic component, said drip collection arrangement comprising a drip collection arrangement structure, said drip collection arrangement structure comprising a drip collection area and an opening facing in a direction of said at least said portion of said metallic component, said drip collection area receiving fluid from said at least said portion of said metallic component, wherein a fluid flow path is defined between said at least said portion of said metallic component and said drip collection area, said fluid flow path extending in a downward direction from said at least said portion of said metallic component through said opening to said drip collection area, wherein said fluid delivered via said fluid flow path is collected in said drip collection area;
a fluid guide channel connected to said drip collection arrangement, said fluid guide channel being in fluid communication with said terminal interior space and an environment located outside of said terminal box, wherein fluid in said terminal box interior space exits said terminal box interior space via a terminal box opening in said terminal box and said drip collection arrangement and said fluid guide channel, wherein said fluid guide channel is in fluid communication with a drain opening, wherein the fluid in said guide channel exits into an environment external to said terminal box and said stator housing via said drain opening, said drain opening being located downstream of said first opening with respect to a flow of the fluid.

16. A pump assembly in accordance with claim 15, wherein said terminal box comprises an outer wall and said electric drive motor comprises a stator housing, said stator housing comprising an outer peripheral stator housing surface, said outer peripheral stator housing surface and said outer wall defining at least a portion of said fluid guide channel, said drip collection arrangement structure comprising two walls arranged in a v-shape in said terminal box interior space, said two walls extending to one another, said terminal box opening being located adjacent to said two walls, said fluid guide channel being in fluid communication with said terminal box opening.

17. A pump assembly comprising:
an electric drive motor comprising a stator housing;
a terminal box connected to said electric drive motor, said terminal box comprising an inner wall, an outer wall, a terminal box interior space, a terminal box opening and electric and electronic components for controlling said electric drive motor, said inner wall defining said terminal box opening and at least a portion of said terminal box interior space;
a metallic component connected to said electric drive motor, said metallic component extending at least from one end of said stator housing to a position in said terminal box interior space, wherein at least a portion of said metallic component is arranged in said terminal box interior space;

a drip collection arrangement operatively connected to said metallic component for receiving condensation water collecting on said metallic component, said drip collection arrangement being arranged in said terminal box interior space in an area located below said metallic component, said terminal box opening being located adjacent to said drip collection arrangement;

a fluid guide channel in fluid communication with said terminal interior space via said terminal box opening, said outer wall defining at least a portion of said fluid guide channel, wherein a drain opening is located adjacent to at least a portion of said outer wall, said channel being in fluid communication with an environment located outside of said terminal box via said drain opening, said stator housing comprising an outer peripheral stator housing surface, said outer peripheral stator housing surface and said outer wall defining at least a portion of said fluid guide channel.

18. A pump assembly in accordance with claim 17, wherein said outer wall is located at a radially spaced location from said stator outer peripheral surface with respect to a longitudinal axis of said stator housing, said outer wall comprising an inner surface, said stator housing outer peripheral surface and said inner surface defining at least a portion of said fluid guide channel, said drip collection arrangement comprising two walls arranged in a v-shape in said terminal box interior space, said two walls extending toward each other, said terminal box opening being located adjacent to said two walls.

19. A pump assembly in accordance with claim 17, wherein said outer wall and said inner wall extend in an axial direction with respect a longitudinal axis of said terminal box, wherein said inner wall is located radially inward of said outer wall with respect to said longitudinal axis of said terminal box, said drip collection arrangement being arranged directly below said at least said portion of said metallic component.

20. A pump assembly in accordance with claim 19, wherein said terminal box opening and said drain opening are oriented in a radial direction with respect to said longitudinal axis of said terminal box.

* * * * *